United States Patent [19]

Saint et al.

[11] Patent Number: 4,970,491
[45] Date of Patent: Nov. 13, 1990

[54] AIR PRESSURE ALERT SYSTEM

[75] Inventors: August Saint, Parsons, Kans.; Robert L. Berger, Pleasant Hill, Mich.

[73] Assignee: Trams Enterprises, Inc., Parsons, Kans.

[21] Appl. No.: 331,875

[22] Filed: Apr. 3, 1989

[51] Int. Cl.⁵ .............................................. B60C 23/02
[52] U.S. Cl. .................................... 340/447; 340/431
[58] Field of Search ............... 340/447, 442, 431, 438, 340/457, 459; 73/146.5, 146.8

[56] References Cited

U.S. PATENT DOCUMENTS

| | | |
|---|---|---|
| 2,576,017 | 11/1951 | Jeffrey et al. .................. 340/457 X |
| 3,178,686 | 4/1985 | Mills . |
| 3,533,063 | 10/1970 | Garcia . |
| 3,588,815 | 6/1971 | Koonce . |
| 3,697,944 | 10/1972 | Murano . |
| 4,024,494 | 5/1977 | Quesnel .......................... 340/457 X |
| 4,075,603 | 2/1978 | Snyder et al. . |
| 4,137,520 | 1/1979 | Deveau . |
| 4,283,707 | 8/1981 | Church . |
| 4,286,253 | 8/1981 | Nagy . |
| 4,334,215 | 6/1982 | Frazier et al. . |
| 4,384,482 | 5/1983 | Snyder . |
| 4,468,650 | 8/1984 | Barbee ........................... 340/447 X |
| 4,574,267 | 3/1986 | Jones . |
| 4,609,905 | 9/1986 | Uzzo . |
| 4,661,796 | 4/1987 | Hirano ............................ 340/438 |
| 4,734,674 | 3/1988 | Thomas et al. . |

Primary Examiner—Joseph A. Orsino
Assistant Examiner—Brian R. Tumm
Attorney, Agent, or Firm—Hovey, Williams, Timmons & Collins

[57] ABSTRACT

A convenient, reliable, and economical low tire pressure alert system (10) for a vehicle provides a graphic display (14) of low tire conditions to a vehicle occupant. The preferred alert system includes a transmitter (12) coupled with a valve stem of each vehicle tire for sensing a respective low pressure condition of the tire and for producing and transmitting digitally encoded amplitude modulated wireless signals in response. The preferred alert system (10) also includes a plurality of indicators (16) as part of a graphic display (14) representative of the vehicle tires, and a receiver (18) coupled with the indicators (16) for selective actuation thereof in response to reception of the low tire pressure signals.

5 Claims, 4 Drawing Sheets

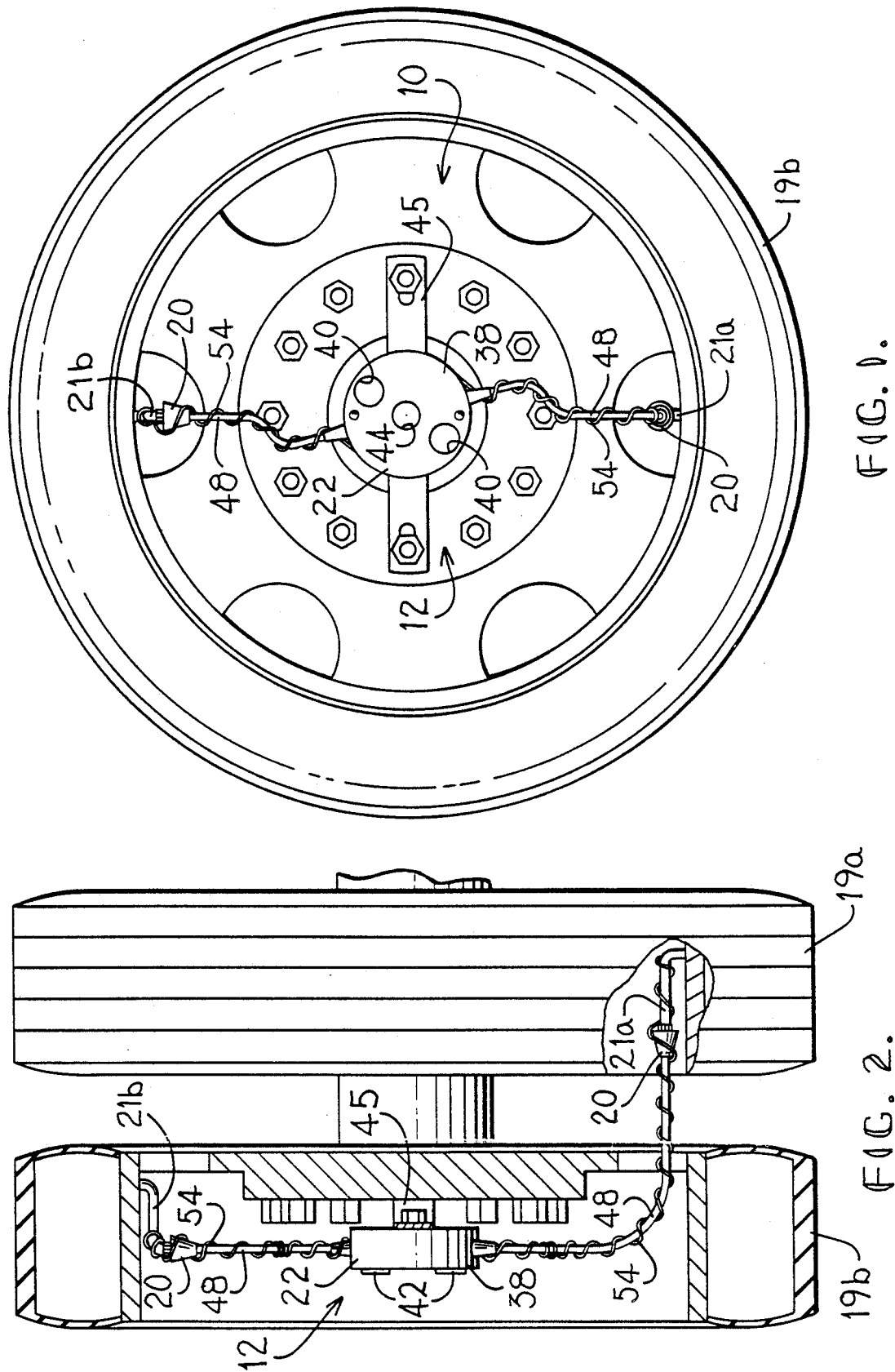

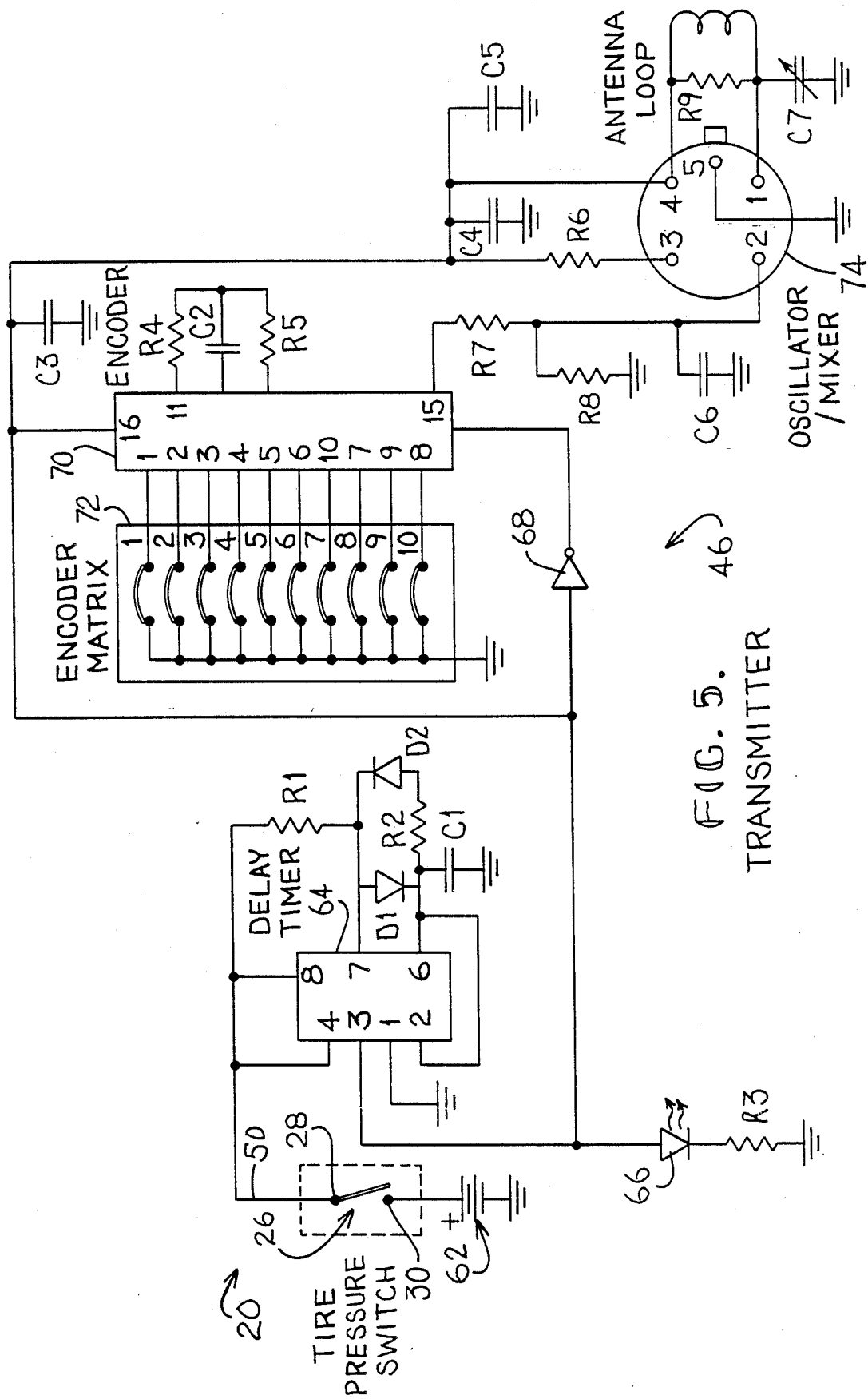
FIG. 5. TRANSMITTER

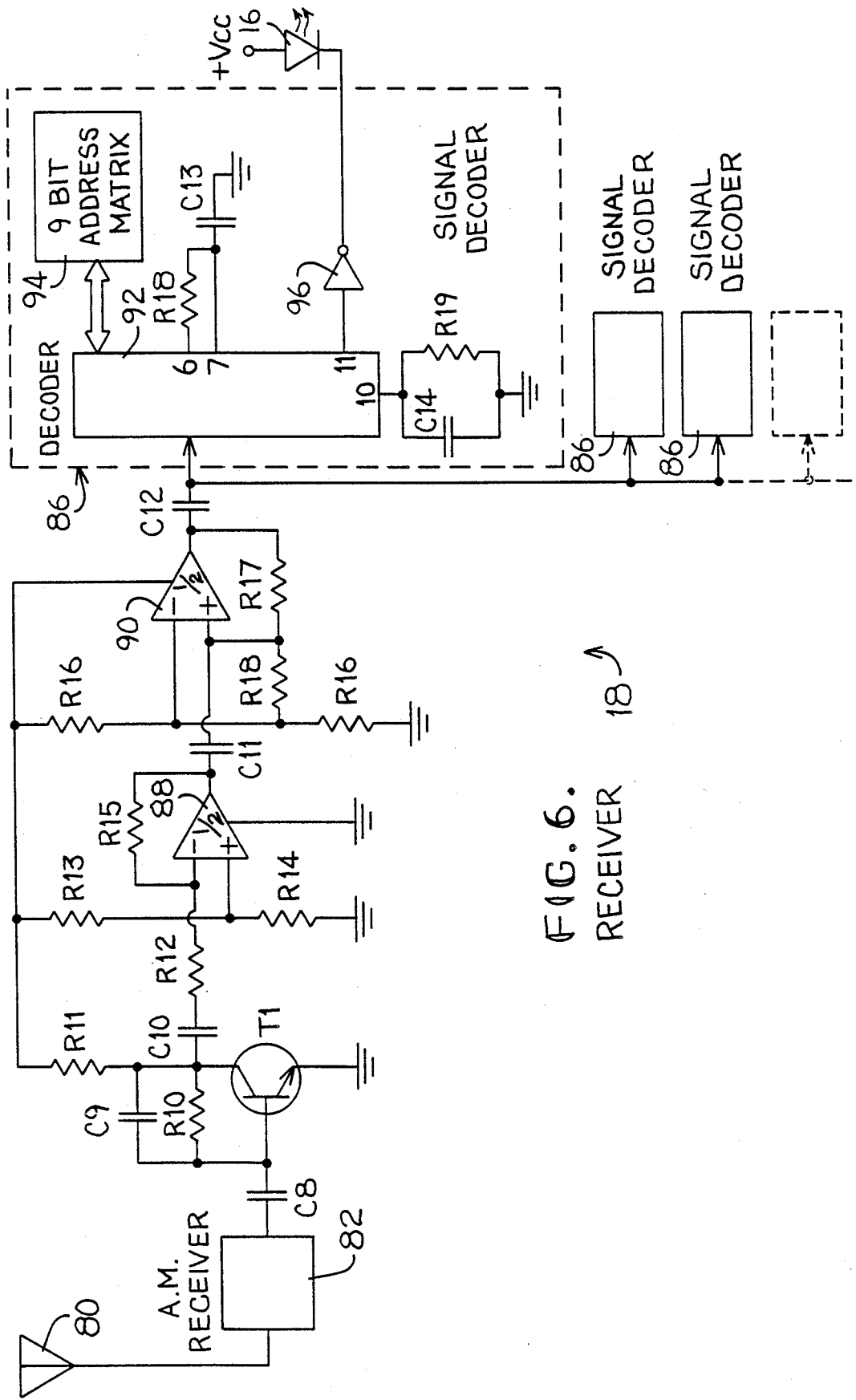
FIG. 6. RECEIVER 18

AIR PRESSURE ALERT SYSTEM

BACKGROUND OF THE INVENTION

1. Field of the Invention

The present invention concerns a low tire pressure alert system for alerting the operator of a vehicle of low pressure conditions of the vehicle's pneumatic tires. More particularly, the present invention concerns an alert system in which individual transmitters are coupled with the valve stems of respective tires for transmitting wireless signals in response to respective low pressure conditions, and in which a receiver located within the vehicle passenger compartment receives the signals and actuates respective indicators corresponding to the vehicle tires.

2. Description of the Prior Art

The prior art discloses a variety of air pressure alert systems for alerting the operator of a vehicle, such as an over-the-road semi-trailer and tractor, to the existence of low tire pressure conditions. More particularly, the prior art discloses systems which use wireless signal transmitters coupled with vehicle tires for sensing and responding to low tire pressure conditions for sending wireless transmit signals to a receiver located within the vehicle's passenger compartment for alerting occupants thereof to the existence of the low pressure conditions.

The prior art devices, however, present a number of problems. For example, they tend to be electronically complex resulting in manufacturing costs too high to allow economical usage. Additionally, these prior art systems either do not identify which tire has low pressure, or identify the tire by code number or the like which makes identification of the low pressure tire cumbersome.

SUMMARY OF THE INVENTION

The present invention solves the problems as outlined above. That is to say, the tire pressure alert system hereof is reliable, electronically simple, economical to manufacture, avoids interference with other alert systems, and provides a graphic representation of the low pressure tire for convenient identification thereof.

Broadly speaking, the preferred alert system hereof includes a transmitter coupled with each tire for transmitting signals in response to a low pressure condition of an associated tire, a display including a plurality of indicators configured to present a graphic representation of the vehicle and tires, and a receiver coupled with the display for receiving and responding to the transmitted signals for selectively actuating the indicators corresponding to low tire pressure conditions. The preferred transmitter produces and sends the signals as digitally encoded, amplitude modulated signals. These signals include a digitally encoded identification of the sending transmitter and thereby an identification of the low pressure tire, and a fleet signal unique to a fleet of vehicles which includes the subject vehicle for avoiding interference with the signals of other fleets. The preferred display includes a graphic representation of the vehicle and the vehicle tires with the indicators coupled therewith for representing the locations of the tires. Other preferred aspects of the present invention are explained hereinbelow.

BRIEF DESCRIPTION OF THE DRAWING FIGURES

FIG. 1 is a side elevational view of the outboard wheel of a dual wheel set included as part of a vehicle showing a coaxially mounted duplex transmitter assembly of the alert system coupled with respective valve stems of the wheel tires;

FIG. 2 is a plan view in partial section of the dual wheel set and transmitter assembly of FIG. 1;

FIG. 5 is an electrical schematic diagram of the preferred transmitter of the alert system; and FIG. 6 is an electrical schematic diagram of the preferred receiver of the alert system.

DETAILED DESCRIPTION OF THE PREFERRED EMBODIMENT

Figure 3:
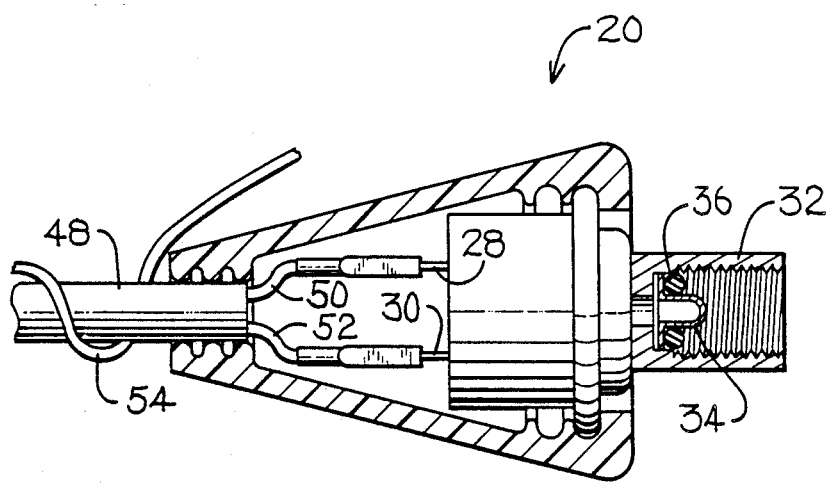
FIG. 3 is a partial sectional view of the preferred pressure switch of the alert system.

The preferred air pressure alert system 10 includes a plurality of transmitter assemblies 12, graphic display 14 including a plurality of indicators 16, and receiver 18. Alert system 10 is preferably used in connection with a conventional over-the-road tractor-trailer combination known as a "semi". Typical semis include eighteen wheels, sixteen of which are arranged as coaxially mounted, dual-wheel sets. FIGS. 1 and 2 illustrate such a dual-wheel set presenting inboard wheel 19a and outboard wheel 19b with the tires thereof presenting respective valve stems 21a and b.

Transmitter assembly 12 includes a pair of pressure switch assemblies 20, transmitter unit 22, and a pair of coupling assemblies 24.

Conventional pressure switch assembly 20 (Texas Instruments Type 20PS OR 36 PS) includes normally closed, pressure-actuated switch 26 presenting a pair of connection terminals 28 and 30, and internally threaded, tire stem valve coupler 32 presenting stem valve depressor 34 therein. Switch 26 is pneumatically actuated and is selected to open upon a pressure of 90 p.s.i.g. and close at 70 p.s.i.g., or to open at 105 p.s.i.g. and close at 85 p.s.i.g., depending upon the type of tire to which pressure switch assembly 20 is connected. Coupler 32 is preferably composed of brass, is internally threaded to allow coupling with the conventional truck tire valve stem, and includes rubber gasket 36 about depressor 34 situated to seal against the end of a valve stem coupled to assembly 24. When in the coupled position, depressor 34 opens the tire stem check valve to allow air pressure to communicate with the internal diaphragm of assembly 20 in order to open and close switch 26.

Preferred transmitter unit 22 includes transmitter housing 38 configured to define a pair of respective battery compartments 40 enclosed by respective, removable, water-tight, compartment covers 42 and to present central, oil-fill passage 44. Bracket 45 preferably mounts transmitter unit 22 to outboard wheel 19b in a coaxial arrangment with oil fill passage 44 also axially aligned with the oil fill opening of wheel 19b as is commonly provided on truck wheels. Transmitter unit 22 also includes a pair of transmitters 46 enclosed within housing 38 which is preferably composed of impact-resistance synthetic resin material and provides a water-tight environment enclosing transmitters 46.

Coupling assemblies 24 couple respective transmitters 46 with switch assemblies 20. Each coupling assembly 24 includes a length of tubular cable 48 enclosing a pair of connection wires 50 and 52, a pair of urethane boots for providing water-tight seal, and cable tension spring 54 coiled around cable 48 with one end anchored to transmitter unit 22 and the other to respective tire valve stems 29a or b.

FIG. 5 is a electrical schematic diagram illustrating a typical transmitter 46 which is coupled by wires 50, 52 to switch 26 by way of terminals 28, 30. Transmitter 46 is designed to respond to the closing of switch 26 upon occurrence of a low tire pressure condition within the associated tire in order to transmit digitally encoded, amplitude modulated signals. These signals include low tire signals and fleet signals. The low tire signals include encoded information representative of the identity of transmitter 46 and thereby of the identity of the associated tire, and the fleet signals represent encoded information representative of the identity of the fleet to which the associated vehicle belongs. As explained further hereinbelow, preferred receiver 18 responds only to reception of both the low tire pressure signals and the fleet identification signals. This provision prevents response of receiver 18 in the event a low tire pressure signal is transmitted by a semi belonging to another fleet.

Terminal 30 of switch 26 is connected by way of wire 52 to the positive terminal of battery 62 included in transmitter 46 and contained within battery compartment 40. Battery 62 is preferably a long-life lithium battery having an output voltage at 7 to 9 v.d.c. in order to operate the circuitry of transmitter 46.

Switch terminal 28 is connected by way of wire 50 to terminals 4 and 8 of delay timer 64 (National Semiconductor type LM555) and to one side of resistor R1 (16.7K ohms). The other side of resistor R1 is connected to timer terminal 7, to the anode of diode D1, and to the cathode of diode D2. Timer terminals 2 and 6 are connected to the cathode of diode D1 and to one side of resistor R2 (1M ohms). The other side of resistor R2 is connected to the anode of diode D2 and to one side of capacitor C1 (2 u.F.) the other side of which is connected to ground.

When switch 26 closes, capacitor C1 begins to charge through resistor R1 and diode D1 to ground. When the voltage across capacitor C1 reaches a threshold voltage of about two-thirds supply voltage, the output at timer terminal 3 goes active high to the anode of light-emitting diode 66, to the input of inverter 68, and to terminal 16 of encoder 70 (type MC145026). Capacitor C1 then begins to discharge through resistor R2 and diode D2 to timer terminal 7. When capacitor C1 has discharged to approximately one-third supply voltage, timer pin 3 goes low at 0 v.d.c. and the charging cycle is repeated. With this arrangment, transmitter circuit 46 transmits the signals for approximately 30 milliseconds every five minutes. This reduces the drain on battery 62 and also satisfies F.C.C. requirements for noncontinuous transmissions.

The cathode of light-emitting diode 66 is connected to one side of resistor R3 (180 ohms) the other side of which is connected to ground. Diode 66 is active whenever terminal 3 is active high at the supply voltage of 7 to 9 v.d.c. and provides a local indication at transmitter 46 of active signals.

Encoder 70 includes terminal 14 which is connected to the output of inverter 68. An active high signal at timer terminal 3 produces an active low signal at the output of inverter 68 to encoder terminal 14 which is activated thereby.

Encoder terminal 11 is connected to one side of resistor R4 (20K ohms), encoder terminal 12 is connected to one side of capacitor C2 (2020 p.F.), and encoder terminal 13 is connected to one side of resistor R5 (10K ohms). The other sides of resistors R4, R5, and capacitor C2 are connected together and provide encoder clock oscillations at 21.5 kilohertz using the preferred component values.

Figure 4:
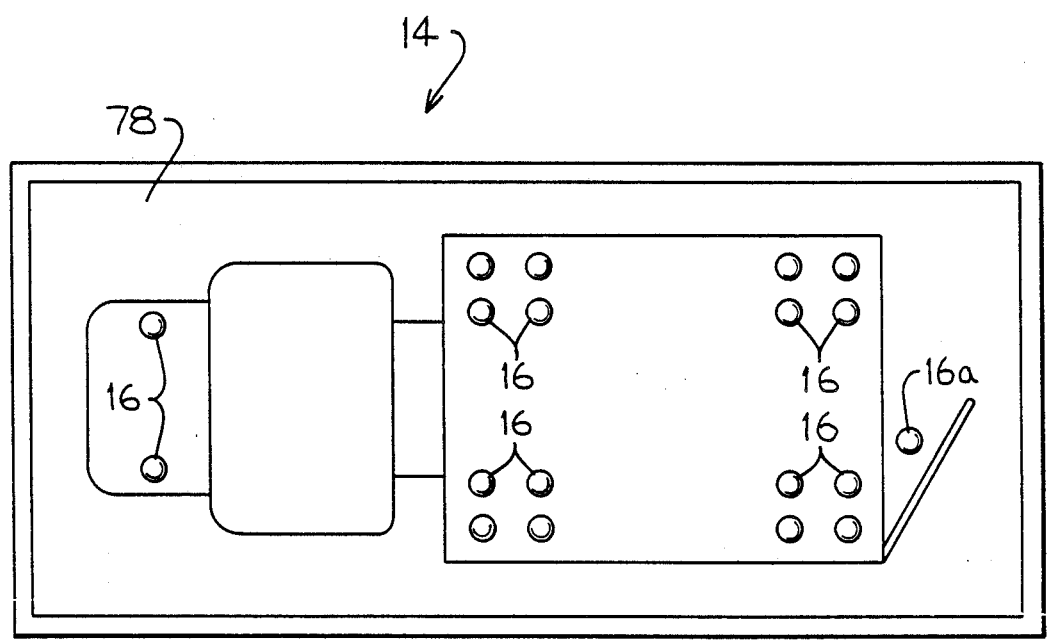
FIG. 4 is an illustration of the preferred display panel of the alert system.

Encoder 70 receives input data at terminals 1 through 10 thereof from 9-bit encoder matrix 72 (type CTS198S-10) connected to encoder 70 as shown in FIG. 4. Bits 1 though 5 of matrix 72 set the wheel identification number and bits 6–9 set the fleet identification number. With five bits available for wheel identification, thirty-two combinations are provided which are more than adequate for most applications. Four bits are provided for fleet identification which allows up to sixteen combinations. As those skilled in the art will appreciate, other hardware components are readily substituted to provide a greater number of possible wheel and fleet identification numbers if desired.

When delay timer terminal 3 goes high, encoder terminal 14 goes low which activates encoder 14, encoder terminal 16 goes high which triggers encoder 70 to load the data as encoded on matrix 72, and encoder 70 then transmits the loaded matrix data as output from terminal 15 in serial format.

Delay timer terminal 3 is also connected to one side of capacitor C3 (0.1 u.f.), the other side of which is connected to ground, to one side of resistor R6 (30K ohms), to one side of capacitor C4 (0.01 0.01 u.F.), the other side of which is connected to ground, to one side of capacitor C5 (470 p.F.), the other side of which is connected to ground, and to terminal 4 of oscillator/mixer 74.

The output from encoder terminal 15 is transmitted by way of resistor R7 (10K ohms) to oscillator terminal 2 which is also connected to one side of resistor R8 (10K ohms), the other side of which is connected to ground, and to one side of capacitor C6 (10 p.F.), the other side of which is connected to ground.

When delay timer terminal 3 goes active high, oscillator 74 is enabled at terminals 3 and 4 thereof, and encoder 70 supplies serial data to terminal 2. With these inputs, oscillator/mixer 74 transmits an amplitude modulated (A.M.) signal at 318 megahertz by way of antenna loop 76 connected across terminals 1 and 4 of oscillator 74. The AM signal is modulated by the digital input at terminal 2 from encoder 70. The Federal Communications Commission authorizes transmissions between 260 and 470 megahertz for this type of usage and a transmission at any frequency in this authorized band is acceptable.

Oscillator terminals 1 and 4 also include resistor R9 (820 ohms) connected thereacross and terminal 1 is also connected to one side of variable capacitor C7 (10 p.F.), the other side of which is connected to ground. Components 70–76 along with resistors R4–9 and capacitors C3–7 are preferably included as part of a package unit Part No. MX1001 available from R. F. Monolithics, Inc. of Dallas, Tex.

Preferred display 14 includes front panel 78 which is the front wall of a conventional housing composed of metal or synthetic resin material which also encloses receiver 18 therein. Front panel 78 preferably includes artwork configured to represent the "semi" or other vehicle being monitored by system 10. Indicators 16 are preferably light-emitting diodes (LED's) placed through appropriately defined holes in front panel 78 and cooperate therewith to present a graphic representation of the vehicle, the tires, and their relative locations. Display 14, receiver 18, and the associated housing are preferably mounted within the passenger compartment of the vehicle such as on the dashboard for convenient viewing by passenger compartment occupants.

Receiver 18 includes antenna 80, detector/receiver 82, amplification and signal conditioning network 84, and a plurality of signal decoder circuits 86 respectively coupled with indicators 16.

Conventional AM antenna 80 receives the 318 megahertz AM signals from transmitter assembly 18 and delivers those signals to detector/receiver 82 which is preferably a self-quenched, superregenerative receiver stabilized by a surface accoustic wave (SAW) device such as that available from R. F. Monolithics, Inc. of Dallas, Tex. This type of receiver is preferred because of its low cost, reliability, and precision. Detector/receiver 82 is tuned to the 318 megahertz AM signal and detects the digital information thereof for delivery to network 84.

The detected signal is received by network 84 at coupling capacitor C8. The other side of capacitor C8 (1.0 u.F.) is connected to the base of transistor T1, one of side of resistor R10, and to one side of capacitor C9. The emitter of transistor T1 is connected to ground and the collector thereof is connected to the other side of resistor R10, to the other side of capacitor C9, to one side of resistor R11, and to one side of capacitor C10. The other side of resistor R11 is connected to supply voltage.

Transistor T1 amplifies the detected digital signal and delivers that signal by way of capacitor C10 and resistor R12 to the negative input terminal of comparator 88 which is one-half of an LM358 unit. The voltage divider network of series-coupled resistors R13 and R14 provide reference voltage at the junction thereof to the positive input terminal of comparator 88. The other side of resistor R13 is connected to supply voltage and the other side of resistor R14 is connected to ground. Resistor R15 provides feedback from the output of comparator 88 to negative input terminal thereof.

The output from comparator 88 is delivered by way of capacitor C11 (1.0 u.F.) to the positive input terminal of comparator 90 which is the other half of the LM358 unit. The voltage divider network of series-coupled resistors R15 (10K ohms) and R16 (12K ohms) provide reference voltage at the junction thereof to the negative input terminal of comparator 90. The other side of resistor R15 is connected to supply voltage which supply voltage is also connected to the LM358 unit. The other side of resistor R16 is connected to ground. Resistor R17 provides voltage feedback from the output of comparator 90 to the positive input terminal thereof which terminal is also connected to one side of resistor R18. The other side of resistor R18 is connected to the junction of resistors R15 and R16 and to the negative input terminal of comparator 90.

Comparators 88 and 90 and associated components condition the amplified digital signal to square it up for delivery to decoder circuits 86 by way of coupling capacitor C12 (1.0 u.F.).

Supply voltage to the components of receiver 18 is preferably provided by the electrical system of the vehicle in which alert system 10 is installed.

Each signal decoder circuit 86 includes decoder 92 (type NC145028), 9-bit address matrix 94 the same as that included in transmitter 46, and conventional digital signal inverter 96.

Each decoder 92 receives the digital signals from network 84 and compares the signals for a match with the address set on matrix 94. A signal decoder network 86 is provided in correspondence with each transmitter 46 and with each indicator 16, and the 9-bit address set on matrix 94 is set identical to the address set on a corresponding transmitter matrix 72. When decoder 92 determines that a match exists between the incoming digital signal and the address defined on matrix 94, the output from terminal 11 of decoder 92 goes active high to inverter 96 which, in turn, goes active low to the cathode of light-emitting diode 16 to sink current therethrough from supply voltage (Vcc) connected to the anode thereof. When this occurs, indicator 16 is activated to show an observer of display 14 that a low tire pressure condition exists in the tire corresponding to the location of indicator 16 as graphically represented by display 14.

Terminal 7 of decoder 92 is connected to one side of resistor R18 (10K ohms), the other side of which is connected to terminal 6, and to one side of capacitor C13 (8200 p.F.), the other side of which is connected to ground. Terminal 10 of decoder 92 is connected to one side of capacitor C14 and to one side of resistor R19 the other sides of which are connected to ground.

As discussed above in connection with transmitter 46, the digital signals include a tire identification portion and a fleet identification portion. Thus, both of these components making must match the address defined on matrix 94 to activate the corresponding indicator 16. This prevents a low tire signal produced by an alert system of another fleet from activating indicator 16.

Display 14 also includes indicator 16a which corresponds to the rear door of the semi-trailer to alert the operator whenever the trailer door is not fully closed. This accomplished by using a transmitter assembly 12 having a conventional microswitch or magnetic switch in place of pressure switch 26. As this provision illustrates, the versatility and thereby utility alert system 10 is enhanced by providing an indicator and corresponding switch for a variety of conditions other than tire pressure. For example, a temperature switch for sensing the temperature of wheel bearings, or of the engine oil, also could be used in place of pressure switch 26 to activate a corresponding indicator 16.

The present invention encompasses many variations in the preferred embodiment disclosed herein. For example, other devices could be used as indicators 16 such as liquid crystal segments or conventional lamps. Additionally, transmitter assembly 12 can be configured to include a single transmitter unit for use in connection with a single tire, or for use with two pressure switches 26 coupled in an electrically parallel arrangement either of which would activate the transmitter. The present invention also contemplates that the functions of decoder network 86 could be performed by a microprocessor having a look-up table stored in memory associated therewith. The look-up table would include the address information of the respective address matricies 94. A microprocessor arrangement is preferred when a large number of indicators 16 are used.

Having thus described the preferred embodiment of the present invention, the following is claimed as new and desired to be secured by Letters Patent:

1. A tire pressure alert system for alerting the occupant of a vehicle to respective low tire pressure conditions of the vehicle's pneumatic tires, the vehicle's having a passenger compartment, the tires having respective valve stems and presenting respective rotational axes, the vehicle being included in a fleet of vehicles, said alert system comprising:

a plurality of transmitter assemblies for coupling with a plurality of associated vehicle tires, each transmitter assembly including:

pneumatic pressure sensing means operable for sensing pneumatic tire pressure and for producing a low pressure signal representative of a low tire pressure condition, coupling means for operably coupling said pressure sensing means with and adjacent to the valve stem of an associated tire and offset from the rotational axis thereof, battery powered transmitter means including means for operably coupling with said pressure sensing means for receiving said pressure signal and responsive thereto for discontinuous, periodic transmission independent of vehicle operation of digital encoded, amplitude modulated, wireless signals representative of said low tire pressure condition of the associated tire and representative of the identity of the fleet to which the vehicle belongs, mounting means for mounting said transmitter means in substantially co-axial alignment with the rotational axis of the associated tire;

local indicator means actuatable in response to said low tire pressure condition for providing a perceptible indication thereof proximal to the associated tire, and means coupling at least two of said transmitter means in a juxtaposed relationship in order to form at least one duplex transmitter means;

display means for mounting within the passenger compartment and including a plurality of selectively actuatable indicators corresponding to said plurality of vehicle tires; and receiver means coupled with said display means for receiving and responding to said wireless signals for selective actuation of said indicators in respective correspondence with said low pressure conditions and the identity of the fleet, said display means including means for configuring said indicators to provide a graphic display indicative of said low pressure conditions; and said mounting means being operable for mounting said duplex transmitter means adjacent an outboard tire and substantially aligned with the rotational axis thereof in order to allow coupling of the respective pneumatic pressure sensing means with the respective valve stems of the outboard and inboard tires, said indicators being coupled with means graphically representing the vehicle for cooperatively presenting a graphic representative of the location of a tire having said low tire condition upon actuation of the corresponding one of said indicators, the vehicle including at least one compartment door shiftable between closed and unclosed positions associated with a freight storage compartment, said alert system further including door status transmission means for coupling with the vehicle for sensing the unclosed position of the door and for producing and transmitting a door status signal representative thereof, said indicators including a door status indicator, said receiving means being operable for receiving and responding to said door status signal while actuating door status indicator upon occurrence of said door unclosed position.

2. The alert system as set forth in claim 1, said pressure sensing means including electrical switch means, said coupling means including means for coupling said switch means with the valve stem of the respective tire for activation when the pneumatic pressure of the associated tire falls below a predetermined level in order to produce said low pressure signal.

3. The alert system as set forth in claim 1, said receiver means including means for decoding said digitally encoded signals and for activating a corresponding one of said indicators in response thereto.

4. The alert system as set forth in claim 1, said indicators including light-emitting diodes.

5. The alert system as set forth in claim 1, said receiver means including a superregenerative receiver.

* * * * *